US009216642B2

(12) United States Patent
Friedmann

(10) Patent No.: US 9,216,642 B2
(45) Date of Patent: Dec. 22, 2015

(54) ACTUATING DEVICE FOR A TORQUE TRANSMISSION DEVICE

(71) Applicant: Schaeffler Technologies GmbH & Co. KG, Herzogenaurach (DE)

(72) Inventor: Oswald Friedmann, Lichtenau (DE)

(73) Assignee: Schaeffler Technologies GmbH & Co. KG (DE)

( * ) Notice: Subject to any disclaimer, the term of this patent is extended or adjusted under 35 U.S.C. 154(b) by 0 days.

(21) Appl. No.: 14/383,444

(22) PCT Filed: Feb. 21, 2013

(86) PCT No.: PCT/EP2013/053430
§ 371 (c)(1),
(2) Date: Sep. 5, 2014

(87) PCT Pub. No.: WO2013/135472
PCT Pub. Date: Sep. 19, 2013

(65) Prior Publication Data
US 2015/0028658 A1 Jan. 29, 2015

(30) Foreign Application Priority Data

Mar. 12, 2012 (DE) .......................... 10 2012 203 819
Nov. 29, 2012 (DE) .......................... 10 2012 221 817

(51) Int. Cl.
*B60K 7/00* (2006.01)
*F16D 28/00* (2006.01)
*F16D 27/14* (2006.01)
*B60K 17/04* (2006.01)

(52) U.S. Cl.
CPC .............. *B60K 7/0007* (2013.01); *F16D 27/14* (2013.01); *F16D 28/00* (2013.01); *B60K 17/046* (2013.01); *B60K 2007/003* (2013.01); *B60K 2007/0038* (2013.01); *B60K 2007/0092* (2013.01)

(58) Field of Classification Search
CPC .......................... B60K 7/0007; B60K 17/046
USPC .............................................. 180/65.51, 65.6
See application file for complete search history.

(56) References Cited

U.S. PATENT DOCUMENTS

| 2,915,918 | A | * | 12/1959 | Comstock et al. ........... 74/571.1 |
| 8,596,395 | B2 | * | 12/2013 | Hirano ........................ 180/65.51 |
| 8,602,145 | B2 | * | 12/2013 | Su et al. ...................... 180/65.51 |
| 2004/0231943 | A1 | * | 11/2004 | Berger et al. ................. 192/3.57 |
| 2006/0032721 | A1 | * | 2/2006 | Langwald ..................... 192/85 C |
| 2007/0252462 | A1 | * | 11/2007 | Holmes et al. ................. 310/112 |
| 2009/0072645 | A1 | * | 3/2009 | Quere ........................... 310/114 |
| 2009/0101424 | A1 | * | 4/2009 | Suzuki ........................ 180/65.51 |
| 2009/0139784 | A1 | * | 6/2009 | Bordini ....................... 180/65.23 |
| 2010/0283345 | A1 | * | 11/2010 | Atallah et al. ................. 310/114 |
| 2012/0264554 | A1 | * | 10/2012 | Savagian et al. .................. 475/5 |
| 2013/0062466 | A1 | * | 3/2013 | Sweet et al. ................ 244/103 R |
| 2013/0187501 | A1 | * | 7/2013 | Theobald et al. .............. 310/114 |
| 2013/0313930 | A1 | * | 11/2013 | Fuchs .............................. 310/83 |

FOREIGN PATENT DOCUMENTS

| AT | 8596 | 10/2006 |
| DE | 1132450 | 6/1962 |
| DE | 19954544 | 8/2001 |
| DE | 10143323 | 3/2003 |
| DE | 102009038928 | 11/2010 |

* cited by examiner

Primary Examiner — Hau Phan
(74) Attorney, Agent, or Firm — Simpson & Simpson, PLLC

(57) ABSTRACT

The invention relates to an actuator device for torque transmission equipment such as a clutch, e.g. a friction clutch or dog clutch, or a brake, comprising at least two electric motors, wherein the rotors of the electric motors are kinematically coupled together via a summation gear, and the summation gear has an output side which is coupled to an actuator of the torque transmission equipment in such a way that a state of the actuator can be set as a function of a relative rotation between the two rotors.

9 Claims, 2 Drawing Sheets

ACTUATING DEVICE FOR A TORQUE TRANSMISSION DEVICE

CROSS-REFERENCE TO RELATED APPLICATIONS

This application is the U.S. national stage application pursuant to 35 U.S.C. §371 of International Application No. PCT/EP2013/053430 filed Feb. 21, 2013, which application claims priority from German Patent Application No. 10 2012 203 819.1 filed Mar. 12, 2012 and German Patent Application No. 10 2012 221 817.3 filed Nov. 29, 2012, which applications are incorporated herein by reference in their entirety.

TECHNICAL FIELD

The invention relates to an actuating device for a torque transmission device such as a clutch, for instance a friction clutch or a positive clutch, or a brake, and in particular to an electro-mechanical wheel driving device that is as such incorporated in a vehicle wheel suspension device and comprises an electric motor attached to a wheel hub carrier relative to a stator.

BACKGROUND

German Patent Application No. DE 199 54 544 A1 discloses a motor vehicle drive comprising a combustion engine that is coupled to the driving wheels of a vehicle axle via a standard transmission, an axle transmission and a driving shafts with universal joint. Two electric motors, which may drive the respective driving wheel electrically, are provided in an intermediate region between the driving wheels and the axle transmission. Mechanical brakes are provided in the region of the driving wheels, which may apply a braking torque to the respective driving wheel.

German Patent Application No. DE 10 2009 038 928 A1 discloses a wheel hub motor comprising a stator arranged in the region of a wheel bearing carrier and a rotor revolving with the wheel hub. In this specific wheel hub motor, the width of an air gap extending between the stator and the rotor is adjustable and modifiable.

SUMMARY

The invention is based on the object of providing an actuating device for a torque transmission device and in particular an electromechanical wheel driving device that is characterized by an advantageous mechanical operating behavior and on the whole allows the operation of a motor vehicle to be harmonized in an advantageous way.

In accordance with the invention, this object is attained by an actuating device for a torque transmission device such as a clutch, e.g. a friction clutch or a positive clutch, or a brake, including at least two electric motors wherein the rotors of the electric motors are kinematically coupled to each other via a summation gear set and wherein the summation gear set has a power take-off side that is coupled to an actuating element of the torque transmission device in such a way that an actuating condition of the actuating element is adjustable as a function of a relative rotation between the two rotors.

In particular, the object is attained by an electromechanical wheel driving device comprising a wheel bearing carrier, a wheel hub supported for rotation relative to the wheel bearing carrier, and a motor device for generating a torque applied to the wheel hub, wherein the motor device includes a first stator and a first rotor as well as a second stator and a second rotor, and wherein an actuating element revolving with the wheel hub is provided in the region of the wheel hub, said actuating element kinematically coupled to the first rotor and to the second rotor in such a way that the actuating condition of the actuating element is adjustable as a function of a relative rotation between the two rotors.

This advantageously allows the torque required for attaining the electrical wheel drive to be generated by two motors that are kinematically coupled in parallel and a mechanical system provided on the hub side and revolving therewith to be adjusted by means of a rotary-angle difference that is actively adjustable in a way that is advantageous in terms of control technology.

Thus the actuating force is generated by an electric motor without requiring any mechanical transmission of the actuating force between the wheel-bearing-side, i.e. stationary, system and the wheel-hub-side, i.e. the co-revolving, system, or a slip ring device for electrically contacting the two co-revolving systems.

Since the drive motors formed by the respective stator/rotor pair generate high drive torques anyway, they are capable of reliably applying the actuating forces required to actuate the hub-side mechanical system.

In the illustrated wheel driving device, one preferably uses two electric motors to drive the wheels, each of the motors preferably providing approximately half the driving power. Their torques/power are preferably added via a planet gear set. A freely adjustable differential torque of the two motors is used to actuate an actuating element such as a spindle to actuate a clutch and/or a brake or any other mechanism co-revolving on the wheel side such as a rotor gap adjustment drive. Providing two "half" motors connected in parallel is easy enough since it does not involve a need for more coil material (such as copper), iron, or other type of magnetic material and since the components are connected in parallel anyway in the power electronics.

In the present arrangement, a driving or braking torque may be applied in any direction (i.e. traction/coast and backwards) and, as an actuator, a positive or negative torque may be applied in any situation. To generate the differential torque, a respective one of the two motors is supplied with a short-term overcurrent, or the rotary field frequency or phase is modified or offset.

The wheel driving motor is divided into two halves, which are connected to the drive (wheel) preferably via a planet gear set or a mechanical lever or inclined planes system. The rotary movement of the planet gears is converted into a movement that is used as an actuator by a spindle, for example. The two electric motors may be actuated independently of each other. Preferably, a parking brake or emergency brake is actuated as the brake. The clutch is preferably used to separate the driving shaft with universal joint from the wheel to switch off the coast torques of the combustion engine drive. During the actuation of the actuator, a respective one of the two electric motors is supplied with a short-term overcurrent to generate the required differential torque to ensure that the wheel torque does not change during the operation of the clutch. As compared to conventional actuators, the electric motors are high-power actuators, the over-torque percentage is small.

A simple lever with limited stroke may be used instead of the planet gear. The spindle may be replaced by a ramp mechanism. Stops may be used to maintain the respective end position. To make them stay in this position, the motors may be actuated with a small differential torque, or the end positions may be self-maintaining due to a ratchet mechanism. If a clutch and a brake are to be actuated, it is preferred that each direction of actuation be used for one element. The system may be used on the front or rear axle.

Thus the present invention proposes a wheel driving device comprising two partial motors that generate the driving power and a planet gear set or levers to combine the driving torques of the two motors. An adjustable differential torque is used to actuate a clutch and/or brake that revolve with the hub system.

In accordance with a particularly preferred embodiment, the kinematic coupling between the actuating element and the two rotors is achieved using a summation gear set. This summation gear set is preferably embodied as what is known as an epicyclic gear train, which as such couples the two rotors and the actuating element in a kinematic way. The summation gear set is preferably designed in such a way that it comprises a planet gear or a planet carrier and that the actuating element is driven via said planet gear or planet carrier. The summation gear set further comprises a ring gear connected to the first rotor, and a sun gear connected to the second rotor. This gearing concept allows an actuating movement to be generated from a difference between the angles of rotation of the first and second rotors, the actuating movement as such allowing a mechanical system co-revolving on the hub side to be actuated, in particular to experience a change of the actuation condition.

This mechanical system is preferably designed in such a way that the actuating path of the actuating element is limited and that the actuating element is movable into a first end position. In this end position, any further movement of the actuating element is blocked to prevent any further relative rotation between the two rotors. When the actuating drive reaches the blocked state, the two rotors are ultimately rigidly coupled to the hub-side system and introduce their entire driving power contribution to the hub-side system, i.e. to the revolving system.

Furthermore, the hub-side mechanical system actuated by the actuating element is preferably designed in such a way that the actuating element is movable into a second end position in which the summation gear likewise assumes a fully-coupled condition. In this condition there is again a direct, i.e. in kinematic terms an essentially rigid coupling between the two rotors and the revolving system driven by the rotors.

Basically, the two rotors are also part of the hub-side, i.e. of the revolving, system. However, the two rotors, or at least one of them, is rotatable relative to the hub-side system within the framework of the actuating path of the actuating element and the gear ratio of the intermediate mechanical system.

In accordance with a particularly preferred embodiment, a clutch device for coupling the wheel hub to a wheel driving shaft device is provided in the region of the hub-side, i.e. the revolving, system, and the clutch device is actuatable via the actuating element. This clutch device may in particular be a friction clutch whose clutch condition is adjustable by the actuating force applied by the actuating element. This friction clutch may in particular be a multi-disc clutch, which as such is arranged to be coaxial with the wheel axle. The actuating element may be used to adjust the contacting pressure of the discs within the multi-disc clutch, i.e. to adjust the coupling of a wheel driving shaft to the hub-side system. The wheel driving shaft may be coupled to an axle differential and, in the engaged condition, acts to transmit a torque between an output of the axle differential and the hub-side system.

The present concept thus also allows actuation of a braking device that as such generates a braking torque effective between the wheel bearing carrier and the wheel hub as a function of an actuating force applied by the actuating element or of a setting otherwise caused by the actuating element. The braking device may be a friction brake and generates a braking torque between the hub-side, i.e. revolving, system and the wheel-bearing-side, i.e. stationary, system.

In accordance with a particularly preferred embodiment, the wheel driving device is designed in such a way that the actuating element is coupled to the braking device and to the clutch device in such a way that in the region of the first end position, the clutch device reaches an engaged condition and in the region of the second end position, the braking device reaches a wheel-braking condition.

The braking device may be designed in such a way that by a corresponding actuation of at least one of the rotors, it allows a controlled adjustment of a braking torque. Apart from that, it is likewise possible for the braking device to be designed in such a way that it acts as a parking or immobilization brake.

It is possible to provide locking means in the region of the mechanical actuating system that includes the actuating element, or to design the actuating drive to be self-locking to ensure that a setting created by a relative rotation is not cancelled by reaction forces effective within the mechanism.

It is furthermore possible to provide other switching means in the region of the hub-side system to allow the torques generated by one or both rotors to be transmitted to the hub-side, i.e. revolving, system before the mechanical actuating system engages the clutch or brake. The two rotors may then drive the wheel even when the clutch is disengaged or the brake is not activated.

The present concept is suited for steered vehicle axles, in particular vehicle front axles, as well as for non-steered vehicle axles or axles that are not steered through large angles, which are typically vehicle rear axles.

The present concept is particularly suited for motorizing vehicles in the medium performance range where each wheel drive device is dimensioned for an electrical power of approximately 12 kW, for example, which is distributed among the two electric motors in a 60:40 ratio, for example, the larger power contribution expediently allotted to the motor that has the greater rotor diameter.

The two motor systems provided for each wheel driving unit may essentially have the same power. Yet it is preferred for the motors to be dimensioned asymmetrically in terms of their driving power. For example, the electric motor whose rotor has the greater diameter may contribute more power than the electric motor whose rotor has the smaller diameter.

The rotor that contributes more power may be rigidly incorporated into the hub-side system, if desired, whereas the actuation of the actuating drive is then implemented by the lower-power rotor. This concept allows any desired power to be applied to the more powerful motor without actuating the actuating drive.

Moreover, the actuating drive may be self-locking in that it generally entrains the lower-power rotor. Thus an adjustment of the actuating drive does not occur until a sufficiently high torque, i.e. a torque that exceeds the idle torque, is generated via the lower-power rotor.

The stators of the two electric motors are preferably actuated by an electronic control unit. This control unit may be designed to provide these different modes of operation and to handle the switching between these modes of operation in such a way that the drive system does not exhibit any operating behavior that would take the passengers in the vehicle by surprise. The control unit in particular offers a first electric-motor mode of operation in which at least one of the electric motors is in a driving mode, and a mode of operation in which the wheel-side mechanical system is engaged or connected.

The electrical connection between the motors and the control unit is preferably designed in such a way that during operation of the vehicle, at least one of the two motors systems may generate braking torques in addition to the wheel-driving torques, i.e. the system assumes a recuperation mode. In this mode, the wheel driving shaft is preferably uncoupled. If the braking torque generated in the recuperation mode is not sufficient, the provided wheel-side braking device may be activated. It is possible, in particular to implement this function, to design the actuating drive in such a way that the actuating force required to activate the friction brake is relatively high and is approximately applied when the maximum generatable recuperation torque of the two motors is applied. The present mechanical system then acts as a safety brake.

BRIEF DESCRIPTION OF THE DRAWINGS

Further features and details of the invention will become apparent from the following description in connection with the drawing.

DETAILED DESCRIPTION

Figure 1:
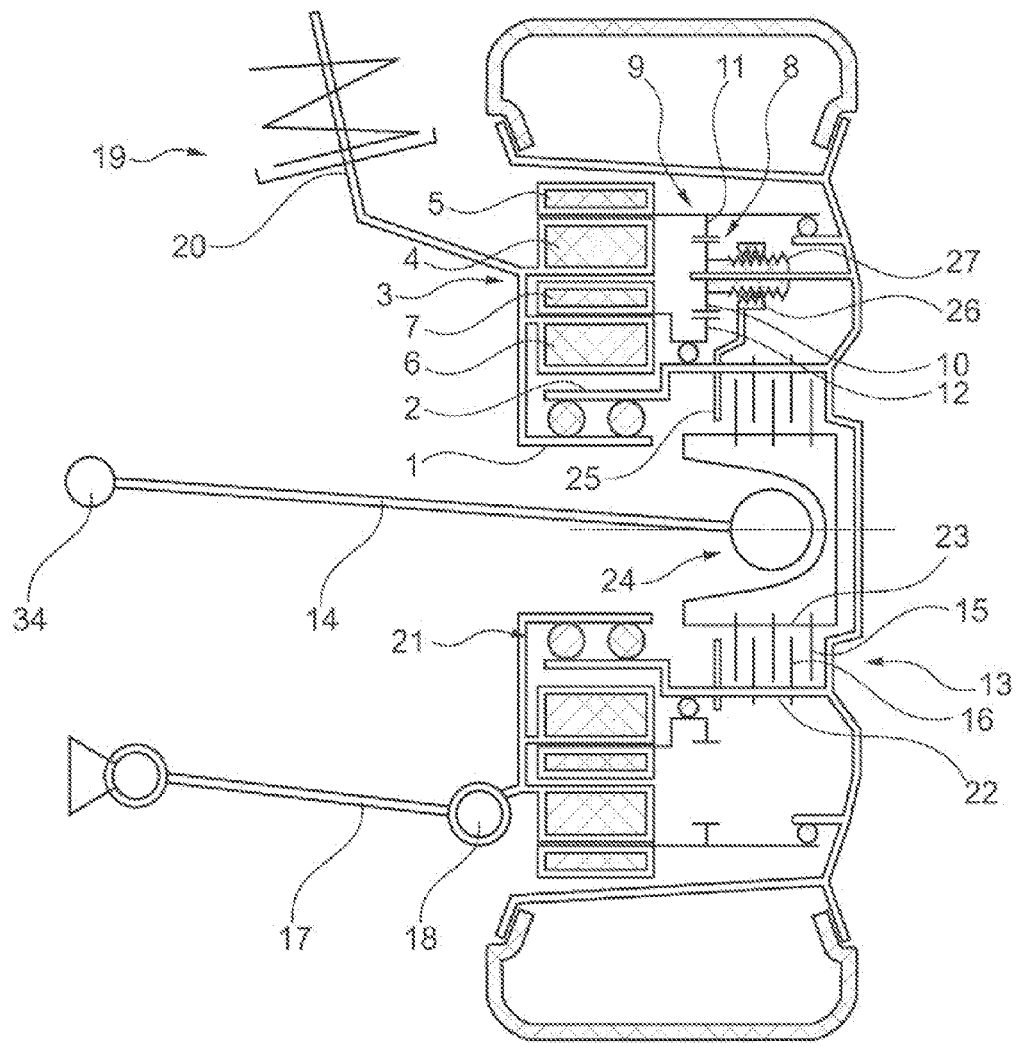
FIG. 1 is a diagrammatic representation to illustrate the structure of a first exemplary embodiment of the present wheel driving device including a shaft coupling that is actuatable by a relative rotation of the rotor pair.

FIG. 1 illustrates an exemplary embodiment of an electro-mechanical wheel driving device for a motor vehicle. The device comprises a wheel bearing carrier 1, a wheel hub 2 supported for rotation on the wheel bearing carrier 1, and a motor device 3 for applying a torque to the wheel hub 2. The motor device 3 is designed in such a way that it comprises a first stator 4, a first rotor 5, a second stator 6, and a second rotor 7.

In the region of the wheel hub 2, an actuating element 8 is provided to revolve with the hub 2. This actuating element 8 is kinematically coupled to the first rotor 5 and to the second rotor 7 in such a way that the actuating condition of the actuating element 8 is adjustable as a function of a relative movement between the two rotors 5, 7.

In the illustrated exemplary embodiment, the kinematic coupling between the actuating element 8 and the two rotors 5, 7 is achieved by a summation gear set 9. In the present example, the summation gear set 9 includes a planet gear 10 for driving the actuating element 8. The summation gear set 9 further comprises a ring gear 11 connected to the first rotor 5. The summation gear set 9 further comprises a sun wheel 12, which is connected to the second rotor 7 in the present example.

The actuating element 8 is embodied as a spindle element and is movable into a first end position in which the summation gear set 9 is in a fully-coupled condition and the torque generated by the two rotors 5, 7 is applied to the wheel hub 2. The actuating element 8 is additionally movable into a second end position in which the summation gear set 9 is likewise in a fully-coupled condition and the two rotors 5, 7 are likewise rigidly connected to the hub-side system.

In the illustrated exemplary embodiment, a clutch device 13 is provided for coupling the wheel hub 2 to a wheel driving shaft device 14. This clutch device 13 is actuatable via the actuating element 8. Here, the clutch device 13 is embodied as a multi-plate clutch. The contact pressure of the discs 15, 16 within the multi-disc clutch 13 is adjustable using the actuating element 8.

The illustrated wheel driving device is integrated in a single-wheel suspension device. Here, the wheel suspension device comprises a lower steering element 17, which may be a transverse link, in particular a wishbone link. This lower steering element 17 is connected to the wheel bearing carrier 1 by an outer lower joint 18. The wheel suspension device further comprises a McPherson strut device 19, which is likewise connected to the wheel bearing carrier 1. In the illustrated exemplary embodiment, the component that is elastically supported, i.e. the lower McPherson strut 20, is rigidly coupled to the wheel bearing carrier 1.

The wheel bearing carrier 1 itself carries a wheel bearing 21, which is embodied as a multi-row rolling bearing, e.g. an angular contact ball bearing. The wheel bearing carriers the wheel hub 2, which here on the whole forms a complex structure and acts as a carrier for the co-revolving mechanical system. The wheel hub 2 carries a mechanical system that is actuated by the actuating drive and is embodied as a mechanical clutch system 13 in the present example. In particular the wheel hub 2 supports a clutch drum 22 in which clutch discs 16 are received to be fixed against rotation but axially displaceable. A clutch hub 23 is located in the clutch drum 22. The discs 15 are guided on said clutch hub 23 to be fixed against rotation but axially displaceable. The clutch hub 23 is coupled to the driving shaft 14 with universal joint via a driving shaft joint 24. The driving shaft joint 24 is in the clutch disc 23. This driving shaft with universal joint 14 is connected to a final drive, in particular a differential, via a joint 34.

The mechanical clutch system 13 is actuated via a pressure plate 25, which is in turn actuated by the present actuating drive. The actuating drive is embodied as a spindle drive that comprises an adjusting nut 26 and an adjusting spindle 27. The adjusting spindle 27 is driven via the planet gear 10. As mentioned above, the planet gear 10 is engaged with the ring gear 11 and the sun gear 12.

The ring gear 11 is coupled to the rotor 5, which is embodied as a permanent-magnet rotor and to which a rotating field is applied via the first stator 4. The sun gear 12 is connected to the second rotor 7, which is embodied as a permanent-magnet rotor. A rotating field is applied to the second rotor 7 via the second stator 6.

Both stators 4, 6 are rigidly connected to the wheel bearing carrier 1 and have multi-pole coils to which a voltage is applied by an electrical circuit otherwise not illustrated herein, causing them to generate a desired rotating field. The circuit is designed in such a way that a recuperation mode is available in addition to a driving mode. In addition, the circuit is designed in such a way that it allows the torques on both partial electric motors to be accurately adjusted and the rotor rotations to be detected.

The ring gear 11 and the sun gear 12 may be rotated relative to each other by a corresponding actuation of the two rotors 5, 7. In the process, the planet gear 10 is caused to rotate to actuate the adjusting spindle 27. Depending on the direction of rotation, the contacting pressure between the discs 15, 16 of the clutch 13 may be increased or decreased in the process.

The illustrated system is designed in such a way that it may be brought into a condition in which the clutch discs 15, 16 are axially compressed and the clutch 13 is engaged. In this condition, no further "forward rotation" of the actuating element 8 is possible and the actuating drive is blocked. The driving torques generated by the rotors 5, 7 will now directly act on the wheel hub 2. In this condition, a driving torque may be transmitted to the wheel hub 2 via the driving shaft 14 with universal joint. In addition, driving power may also be provided by the two electric motors.

If the two rotors 5, 7 are actuated via the associated stators in such a way that the actuating element 8 is moved "backwards", the clutch discs 15, 16 are released and the clutch 13 is disengaged. Subsequently, the actuating drive again reaches an end position and the summation gear set 9 is blocked. In this condition, if desired, a driving torque may be transmitted to the wheel hub 2 via at least one of the rotors 5, 7, in particular when the voltage applied to the two stators 4, 6 is adapted in such a way that the clutch 13 is not reactivated.

In this exemplary embodiment, the wheel hub 2 or rather the revolving system coupled thereto forms a planetary support for the planet gear 10 provided to actuate the actuating drive. The ring gear 11, the planet gear 10, and the sun gear 12 here form a summation gear set 9 that is blocked when end positions of the actuating drive are reached, allowing a direct transmission of the torque of at least one of the rotors 5, 7 to the wheel hub.

Figure 2:
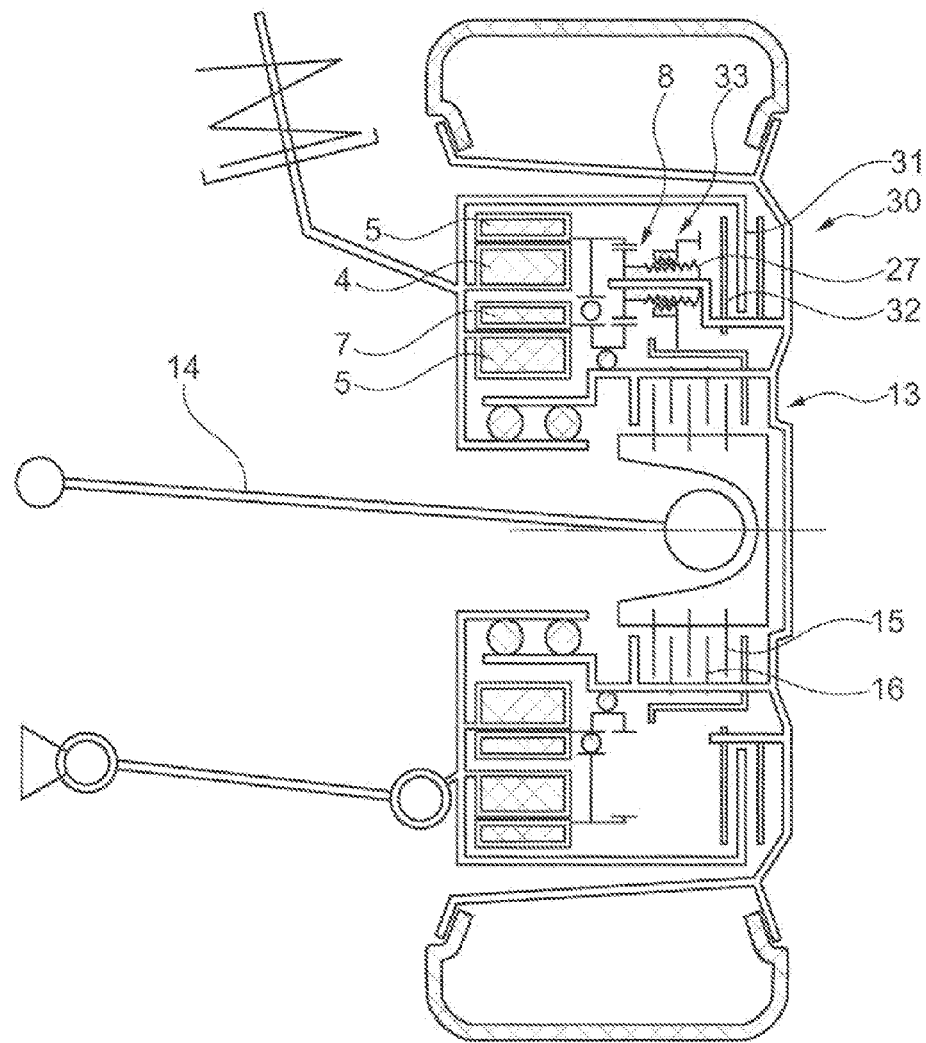
FIG. 2 is a diagrammatic representation to illustrate the structure of a second exemplary embodiment of the present wheel driving device likewise including a shaft coupling that is actuatable by a relative rotation of the rotor pair and including a braking device actuatable by the rotor pair.

FIG. 2 illustrates a second embodiment of an electromechanical wheel drive. In this exemplary embodiment, a braking device 30 is provided. The braking device 30 may couple the wheel-hub-side system, i.e. the revolving wheel system, to the stationary system, i.e. to the wheel bearing carrier 1 in a defined, friction-locking way. Actuation of the braking device 30 is in turn achieved via the actuating drive that is actuated via the wheel-driving motors.

As described above with respect to the exemplary embodiment of FIG. 1, the alternative embodiment illustrated in FIG. 2 further comprises a clutch device 13 for selectively coupling a wheel driving shaft 14 to the hub-side system.

The illustrated wheel driving device is designed in such a way that the clutch device 13 is engaged when the actuating element 8 reaches a first end position. The braking device 30 is activated once the actuating element 8 has moved back into the region of the second, opposite end position. In all other respects, the description of FIG. 1 applies in an analogous way.

The co-revolving mechanical system on the hub side, which is actuated by the two rotors 5, 7, is illustrated in an extremely simplified way. On the whole, the system is designed to revolve without imbalance. For this purpose, the mechanical system may in particular be symmetrical. By way of example, the actuating drive provided to actuate the brake 30 and the clutch 13 is embodied as a spindle drive, for example. It may, however, be of different design.

The braking device 30 comprises a stationary pressure ring 31, which may float in the axial direction but is fixed against rotation, and a friction ring 32 that is axially movable towards the former. The contacting pressure between the friction ring 32 and the pressure ring 31 is adjusted via a spindle element 27. The spindle element 27 is activated by adapting the torque at the two rotors 5, 7.

In the illustrated exemplary embodiment, the braking device 30 is activated by moving the inner rotor 7 "backwards" relative to the outer rotor 5. The clutch device 13 is activated by moving the inner rotor 7 "forward" relative to the outer rotor. This concept allows the clutch device 13 to be engaged when a maximum torque is generated at the rotors 5 and 7 and thus provides a boost mode in which a driving torque may be introduced into the wheel hub 2 by the electric motor and via the driving shaft 14 with universal joint. In this mode, the clutch discs 15, 16 are urged towards each other as a function of the adjusting force at the adjusting spindle 27. To achieve a mode of operation that is exclusively electric-motor-driven, the actuating spindle 27 is released and the clutch 13 is disengaged.

The mechanism provided for actuating the components co-revolving on the hub side and actuated by at least one of the rotors 5, 7 may be designed in such a way that it comprises further actuating elements that allow the two rotors 5, 7 to be coupled to the wheel hub 2 without actuating the clutch 13 or brake 30 and in such a way that the rotors apply a driving or braking torque to the wheel hub 2. For this purpose, an electromechanical locking mechanism may be provided, which is actuatable in such a way that it selectively blocks the adjusting drive 33. The locking mechanism may be controlled by a voltage event that is inductively taken from the first or second stator 4, 5, and, for this purpose, comprises a conductor loop extending in the respective rotor 5, 7.

In the present exemplary embodiment, the rotors 5, 7 are embodied as permanent magnet rotors. They may also be embodied as coil rotors, if desired as rotors electrically coupled to each other, or in particular as squirrel-cage rotors.

LIST OF REFERENCE NUMERALS 1 wheel bearing carrier
2 wheel hub
3 motor device
4 stator
5 rotor
6 stator
7 rotor
8 actuating element
9 summation gear set
10 planet gear
11 ring gear
12 sun gear
13 clutch device
14 wheel driving shaft device
15 discs
16 discs
17 steering element
18 joint
19 McPherson strut device
20 lower McPherson strut
21 wheel bearing
22 clutch drum
23 clutch hub
24 driving shaft joint
25 pressure plate
26 adjusting nut
27 adjusting spindle
30 braking device
31 pressure ring
32 friction ring
33 adjusting drive

What is claimed is:
1. An electromechanical wheel driving device for a torque transmission device, comprising:
    an electric motor including:
        first and second rotors; and,
        first and second stators;
    a summation gear including:
        a first component non-rotatably connected to the first rotor;

a second component non-rotatably connected to the second rotor and, a third component; and, an actuating element including a pressure plate engaged with the third component, wherein:

relative rotation between the first and second rotors is arranged to rotate the third component; and, rotation of the third component is arranged to axially displace the pressure plate.

2. The actuating device for a torque transmission device recited in claim 1, wherein:

the summation gear set is embodied as a planet gear set including a ring gear, a sun gear, at least one planet gear, and a planet carrier;

the first component includes the ring gear;

the second component includes the sun gear;

the third component includes the at least one planet gear;

the at least one planet gear includes or is connected to a threaded region of the actuating element; and, a displacement of the actuating element is suitable for actuating the torque transmission device or for modifying the torque transmission device in terms of its torque transmission capacity.

3. The actuating device recited in claim 2, wherein the planet carrier is connected to a power take-off side of the torque transmission device, causing a torque generated by one or both of the electric motors to be transmittable to the power take-off side.

4. An electromechanical wheel driving device, comprising:

a wheel bearing carrier, a wheel hub supported for rotation on the wheel bearing carrier;

a motor device for generating a torque at the wheel hub, the motor device including a first stator and a first rotor as well as a second stator and a second rotor;

a summation gear including:

a ring gear connected to the first rotor;

a sun gear connected to the second rotor; and, a planet gear; and, an actuating element including a pressure plate engaged with the sun gear, wherein:

relative rotation between the first and second rotors is arranged to:

rotate the ring gear and the sun gear with respect to each other; and, rotate the planet gear to axially displace the pressure plate.

5. The electromechanical wheel driving device recited in claim 4, wherein the actuating element is movable into a first end position in which the summation gear set assumes a fully coupled condition, applying the torque generated by the first and second rotors to the wheel hub, and wherein the actuating element is movable into a second end position in which the summation gear set assumes a fully coupled condition.

6. The electromechanical wheel driving device recited in claim 5, wherein a clutch device is provided for coupling the wheel hub to a wheel driving shaft device, and wherein the clutch device is actuatable by means of the actuating element.

7. The electromechanical wheel driving device recited in claim 6, wherein the clutch device is embodied as a multi-disc clutch and a contacting pressure of discs within the multi-disc clutch is adjustable by means of the actuating element.

8. The electromechanical wheel driving device recited in claim 6, wherein a braking device is provided, which generates a braking torque effective between the wheel bearing carrier and the wheel hub, wherein said braking device is actuatable via the actuating element, and wherein the actuating element is coupled to the braking device and to the clutch device in such a way that in the region of the first end position, the clutch device reaches a coupling condition, and in the region of the second end position, the braking device reaches a wheel-braking condition.

9. An electromechanical wheel driving device for a torque transmission device, comprising:

an electric motor including:

first and second rotors; and, first and second stators;

a summation gear including:

a ring gear connected to the first rotor;

a sun gear connected to the second rotor; and, a planet gear; and, an actuating element including:

a nut;

a pressure plate connected to the nut; and, a spindle passing through the nut and connected to the planet gear, wherein:

relative rotation between the first and second rotors is arranged to:

rotate the spindle within the nut; and, axially displace the nut and the pressure plate.

* * * * *